United States Patent

Hargenrader et al.

[11] Patent Number: 5,656,991
[45] Date of Patent: Aug. 12, 1997

[54] APPARATUS FOR TESTING AN ACTUATABLE RESTRAINT SYSTEM

[75] Inventors: Johnny Thomas Hargenrader, Brighton; Christopher Lawrence Roberts, Monroe, both of Mich.

[73] Assignee: TRW Inc., Lyndhurst, Ohio

[21] Appl. No.: 446,500

[22] Filed: May 22, 1995

[51] Int. Cl.⁶ .................................................. B60Q 1/00
[52] U.S. Cl. .................... 340/438; 340/660; 340/661; 340/664; 280/728.1; 307/10.1
[58] Field of Search .................... 340/433, 660, 340/661, 664; 280/735, 728.1, 728.2; 37/10.1

[56] References Cited

U.S. PATENT DOCUMENTS

| | | | |
|---|---|---|---|
| 3,629,816 | 12/1971 | Gillund | 180/271 |
| 3,714,627 | 1/1973 | Dillman et al. | 340/436 |
| 3,767,002 | 10/1973 | Gillund | 340/438 |
| 3,818,431 | 6/1974 | Hosaka | 340/438 |
| 4,016,426 | 4/1977 | Nishioka | 307/10.1 |
| 4,220,871 | 9/1980 | Yasui et al. | 307/10.1 |
| 4,636,715 | 1/1987 | Borkowicz | 324/502 |
| 4,673,912 | 6/1987 | Kumasaka et al. | 340/438 |
| 4,851,705 | 7/1989 | Musser et al. | 307/10.1 |
| 4,980,573 | 12/1990 | White et al. | 307/10.1 |
| 4,987,316 | 1/1991 | White et al. | 340/436 |
| 5,045,835 | 9/1991 | Masegi et al. | 340/438 |
| 5,046,149 | 9/1991 | Nunan | 307/10.1 |
| 5,085,464 | 2/1992 | Behr et al. | 340/436 |
| 5,146,104 | 9/1992 | Schumacher et al. | 307/10.1 |
| 5,181,011 | 1/1993 | Okano | 340/438 |
| 5,187,465 | 2/1993 | Stonerook et al. | 280/735 |
| 5,194,755 | 3/1993 | Rhee et al. | 307/10.1 |
| 5,501,486 | 3/1996 | Fujita et al. | 340/438 |
| 5,541,523 | 7/1996 | Tourville et al. | 340/438 |

*Primary Examiner*—Jeffery Hofsass
*Assistant Examiner*—Mark S. Rushing
*Attorney, Agent, or Firm*—Tarolli, Sundheim, Covell, Tummino & Szabo

[57] ABSTRACT

An apparatus for testing the operativeness of a squib in an active restraint system wherein the squib has a resistance value, when operative, within a predetermined range of resistance values. The squib is connected in series with a firing circuit to a first source of electrical energy. A monitoring circuit includes a second source of electrical energy and a bridge circuit. The bridge circuit includes a biasing resistor network and a reference resistor network, both networks being operatively connected to the second source of electrical energy. The biasing resistor network establishes a flow of test current through the squib, the test current being the only continuous non-actuating current through the squib. The biasing resistor network establishes a test voltage value at one terminal of the squib. The monitoring circuit further includes a comparator for comparing the test voltage value at the one terminal of the squib against the squib reference voltage value of the reference resistor network. A controller monitors the signal from the comparator and controls an indicator in response thereto.

6 Claims, 2 Drawing Sheets

Fig.1

APPARATUS FOR TESTING AN ACTUATABLE RESTRAINT SYSTEM

BACKGROUND OF THE INVENTION

1. Technical Field

The present invention is directed to an actuatable occupant restraint system for a vehicle and is particularly directed to an apparatus for testing the operativeness of a squib of such a restraint system.

2. Description of the Prior Art

Air bag restraint systems for passenger vehicles are known in the art. Such systems typically include an actuation circuit and a diagnostic circuit. The actuation circuit has an associated, electrically actuatable igniting device, referred to as a squib. The system further includes a crash sensing device, such as an inertia sensor, for sensing the crash acceleration of the vehicle. When the inertia sensor is subjected to a crash acceleration greater than a predetermined value, the inertia sensor closes an electrical switch.

The electrical switch and the squib are connected in series across a source of electrical energy. When the electrical switch is closed as a result of vehicle crash acceleration greater than a predetermined level, electric current of sufficient magnitude and duration ignites the squib. The squib, when ignited, ignites a combustible gas generating composition and/or pierces a container of pressurized gas operatively connected to the air bag, which results in inflation of the air bag. Squib ignition can also control other actuatable restraints such as seat belt pretensioners, seat belt locks, knee bolsters, etc.

If the actuation circuit is inoperative, the restraint would not be actuated upon the occurrence of a crash condition. Such inoperative conditions include (i) an open circuited squib, (ii) a short circuited squib, or (iii) a short between a squib terminal and the supply voltage, and (iv) a short between a squib terminal and electrical ground.

The diagnostic circuit tests the operativeness of the actuation circuit and controls an indicator to inform the vehicle operator upon the occurrence of a detected system error. Known restraint system diagnostic circuits typically include numerous switching components to monitor voltage values at various test points in the firing circuit. Prior art diagnostic systems use various methods or algorithms for calculating firing circuit component operating/performance parameters using the monitored voltage values. These calculated component values are compared against associated limits. When an open or short circuit condition exists or a calculated component value is outside of its associated limits, an error or fault condition has occurred and an indicator is energized.

SUMMARY OF THE INVENTION

The present invention provides an apparatus for testing the operativeness of a squib in an actuatable restraint system.

In accordance with the present invention, an apparatus is provided for testing the operativeness of a squib in an actuatable restraint system. The squib has a resistance value, when operative, within a predetermined range of resistance values. The squib is connected in series with a firing circuit across a first source of electrical energy. The firing circuit includes an actuatable switch. Actuation of the switch results in electrical current passing through the squib from the first source of electrical energy sufficient to ignite the squib. The apparatus comprises monitoring circuit means for monitoring the operativeness of the squib. The monitoring circuit means includes a second source of electrical energy wherein the second source of electrical energy is a regulated source of electrical energy. The monitoring circuit means further includes a bridge circuit means having a biasing resistor network and a reference resistor network. Both biasing resistor network and the reference resistor network are operatively connected to the second source of electrical energy. The biasing resistor network is electrically connected in series with the squib and in parallel with the firing circuit. The biasing resistor network establishes a flow of test current through the squib, the test current being the only continuous non-actuating current through the squib. The biasing resistor network and the reference resistor network each including associated resistors having selected resistor values the reference resistor network establishing a squib reference voltage value and the biasing resistor network establishing a test voltage value at one terminal of the squib. The monitoring circuit means further includes comparing means for comparing the test voltage value at the one terminal of the squib resulting from the test current through the biasing resistor network against the squib reference voltage value of the reference resistor network and for providing a signal indicative of the comparison. The signal indicative of the comparison is indicative of the operativeness of the squib. The resistor values of the biasing resistor network, the resistor values of the reference resistor network, and the value of the second source of electrical energy are selected so that the at least one terminal of the squib will provide an expected voltage value, when the squib is operative, that falls within a range of values defined by the reference resistor network. The apparatus further includes control means for monitoring the signal from the comparing means of the monitoring circuit means. The control means controls an indicator in response to the signal from the comparing means indicative of the comparison.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENT

Figure 1:
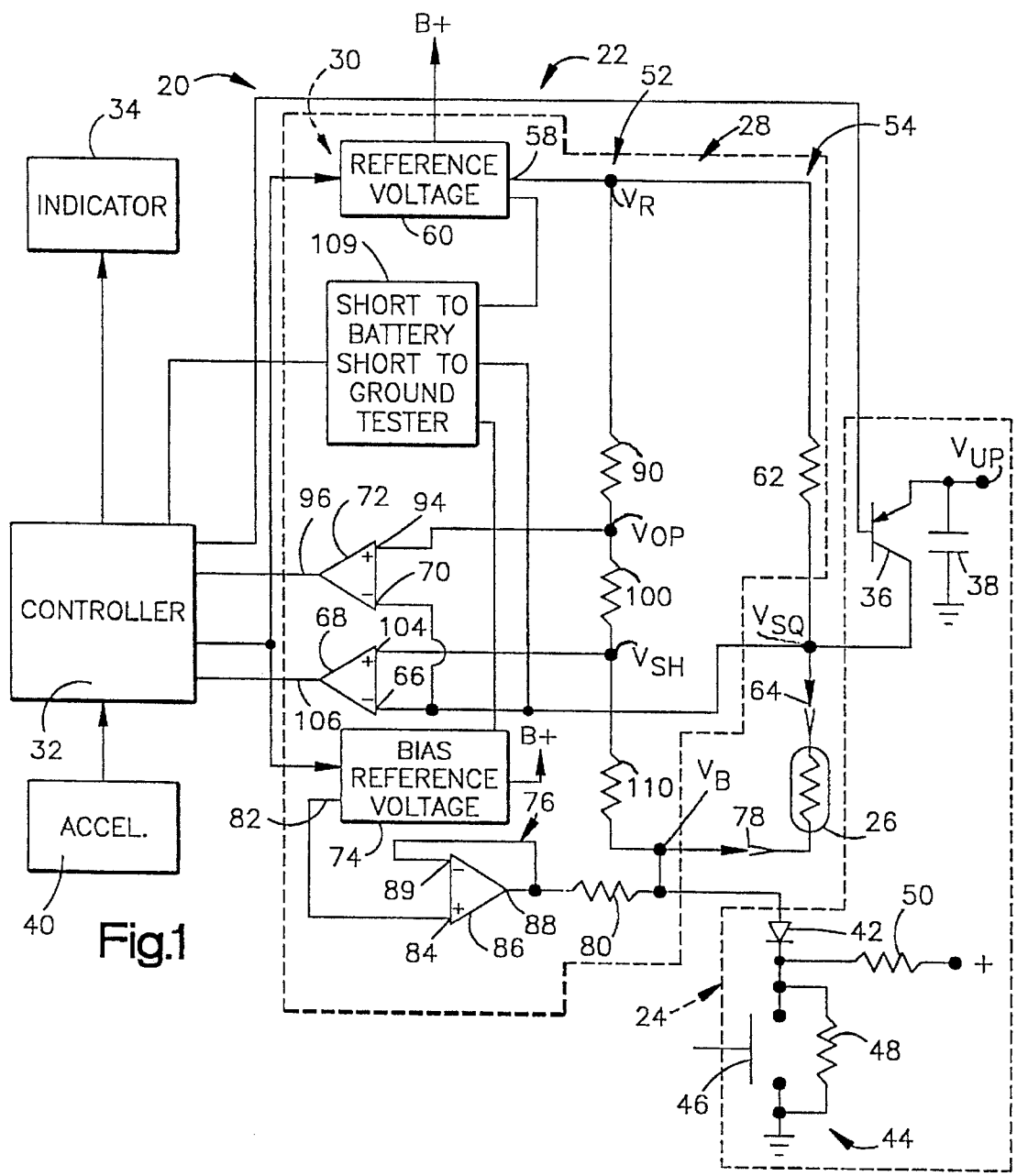
FIG. 1 is a schematic diagram of an apparatus made in accordance with the present invention.

Referring to FIG. 1, an occupant restraint control system 20, made in accordance with the present invention, includes (i) a diagnostic circuit 22, and (ii) an actuation circuit 24. The actuation circuit 24 is connected to a squib 26. The squib 26 has a resistance value $R_{sq}$. The squib 26 is external to the remainder of the control system 20 and is mounted within, and is operatively coupled with, an occupant restraint device such as an air bag, seat belt retractor, seat belt pretensioner, etc. For purposes of this description, it is assumed that squib 26 is operatively coupled to an air bag inflator.

Diagnostic circuit 22 includes a bridge network 28 and a monitoring circuit 30 connected to the bridge network 28. Monitoring circuit 30 is also connected to the squib 26 and monitors the operativeness of the squib. Monitoring circuit module 30 may be embodied with discrete circuitry, an application specific integrated circuit ("ASIC"), or an integrated circuit.

A controller 32 is connected to monitoring circuit 30 and to an indicator 34. The indicator 34 is a light or buzzer located in the passenger compartment of a vehicle. Controller 32 actuates the indicator 34 if a squib fault condition is detected by monitoring circuit 30. In accordance with one embodiment of the present invention, the monitoring circuit 30 monitors for any one of four fault conditions. These fault conditions include (i) a shorted squib, (ii) an open squib, (iii) the squib shorted to the positive supply voltage, and (iv) the squib shorted to electrical ground.

Actuation circuit 24 includes a switching transistor 36 that is electrically connected in series between one terminal of squib 26 through connector 64 and a first source of electrical energy $V_{UP}$. One terminal of a storage capacitor 38 is connected to the junction of transistor 36 and $V_{UP}$. The other terminal of capacitor 38 is connected to electrical ground. The first source of electric energy is the output of an up-converter (not shown) which is, in turn, connected to the vehicle battery, as is known in the art. $V_{UP}$ provides an electrical energy source that charges capacitor 38 with enough energy to ignite squib 26 in the event of a deployment crash condition. Those skilled in the art will appreciate that the junction between transistor 36 and capacitor 38 could be connected directly to the battery.

An output of controller 32 is controllably connected to the base of transistor 36. An accelerometer 40 is operatively mounted in the vehicle and electrically connected to controller 32. Upon the occurrence of a crash condition, the accelerometer 40 provides controller 32 a crash acceleration signal having an amplitude that is functionally related to the acceleration experienced by the vehicle. The controller 32 continuously monitors the accelerometer output signal and determines whether the vehicle is experiencing a deployment crash condition.

A deployment crash condition is one in which it is desirable to actuate an actuatable restraining device to hopefully enhance occupant protection during a crash condition. The process by which the controller 32 evaluates the crash acceleration signal and determines whether a deployment crash condition is occurring is referred to as a "crash algorithm." The crash algorithm used by controller 32 may be any one or combination of a number of known crash algorithms. If controller 32 determines a deployment crash condition is occurring, controller 32 actuates transistor 36 to an ON condition.

The other terminal of squib 26 is connected to an anode of a diode 42 through a connector 78. The cathode of diode 42 is connected to one terminal of a mechanical inertia sensor 44, referred to as a "safing sensor." The cathode of diode 42 is further connected to a positive supply voltage through a resistor 50. Safing sensor 44 includes a normally open inertia switch 46 and an associated parallel connected resistor 48. The other terminal of safing sensor 44 is connected to electrical ground. The safing sensor 44 may be mounted at any appropriate location in the vehicle for sensing a crash condition, but is preferably mounted within the module containing the rest of the control system 20. When a crash of sufficient intensity occurs, the inertia switch 46 closes.

When a crash occurs, the accelerometer 40 outputs a crash acceleration signal to the controller 32. Assuming the controller 32 determines that the crash is a deployment crash condition, transistor 36 is turned ON. Such a crash condition (assuming a sufficient crash acceleration) results in the inertia switch 46 closing. When transistor 36 is ON and switch 46 is closed, sufficient electrical current passes through squib 26 to ignite the squib. Closure of switch 46 results in the cathode side of diode 42 being pulled to ground thereby insuring the diode 42 is forward biased. When squib 26 is ignited, it ignites a gas generating material and/or pierces a container of pressurized fluid which, in turn, inflates an air bag. Alternatively, actuation of squib 26 could actuate seat belt pretensioners, knee bolsters, seat belt locks, etc.

Bridge resistor network 28 includes two resistor networks connected in parallel. Specifically, bridge network 28 includes (i) a reference resistor network 52, and (ii) a bias resistor network 54. The bias resistor network 54 uses the squib 26 to complete a current path. The parallel resistor networks 52, 54 have a first connection node or common junction, $V_R$. Monitoring circuit module 30 includes a reference voltage source 60 having an output 58 connected to junction $V_R$. The reference voltage source 60 is connected to the vehicle battery B+ and provides a regulated voltage having a selected value. The controller 32 is controllably connected to the reference voltage source 60 to control switching ON and OFF of the source 60, i.e., controls whether electrical energy is applied to $V_R$ or not. The parallel networks 52, 54 have a second connection node or common terminal $V_B$ connected to the anode of diode 42, Bias resistor network 54 includes a resistor 62 connected between junction $V_R$ and one terminal of squib 26 through the connector 64. The junction between resistor 62 and squib 26 is designated $V_{SQ}$ and is referred to as the squib high side or the positive side of the squib. Junction $V_{SQ}$ is connected to (i) the inverting terminal 66 of a comparator 68, and (ii) the inverting input terminal 70 of a comparator 72 in monitoring circuit module 30.

The other terminal of squib 26 is connected to the common junction $V_B$ through connector 78. The squib terminal connected to $V_B$ is referred to as the squib low side or the negative side of the squib. A second reference voltage source 74 is connected to the battery B+ and is operatively coupled to junction $V_B$ through a voltage follower 76, a resistor 80, and a connector 78. Specifically, an output 82 of reference voltage source 74 is connected to a positive input 84 of an operational amplifier 86. Output 88 of amplifier 86 is connected to junction $V_B$ through resistor 80. Output 88 of operational amplifier 86 is connected to the negative input 89 of operational amplifier 86. Voltage follower 76 is current limiting and provides a constant bias voltage from reference voltage source 74 to junction $V_B$.

The bias reference voltage 74 is connected to the vehicle battery B+ and provides a regulated voltage value to the squib low side. The value of the bias reference voltage 74, resistor 80, resistor 50, and the value of the voltage source connected to resistor 50 are selected so that the diode 42 is maintained in a reverse-biased condition when switch 46 is open. Also, the value of the bias reference voltage 74 is less than the value of the reference voltage 60 so that current normally flows through the reference network 52 and the bias network 54. Reference voltage 60 and bias reference 74 together provide a second source of electrical energy for the bridge network 28.

Reference resistor network 52 includes a resistor 90 having one terminal connected to junction $V_R$ and a second terminal connected to a first terminal of a resistor 100. The junction between resistors 90 and 100 is designated $V_{OP}$. Junction $V_{OP}$ is connected to the non-inverting input 94 of comparator 72 of monitoring circuit module 30. An output 96 of comparator 72 is connected to controller 32.

The second terminal of resistor 100 is connected to a first terminal of a resistor 110. The junction between resistors 100 and 110 is designated as $V_{SH}$. $V_{SH}$ is connected to non-inverting input 104 of the comparator 68 of monitoring circuit module 30. An output 106 of comparator 68 is connected to controller 32. The second terminal of resistor 110 is connected to junction $V_B$.

The value of the reference voltages 60, 74 and the value of resistors 90, 100, and 110 are selected so that the output of comparator 72 provides an indication as to whether squib 26 is electrically open circuited and the output of comparator 68 provides an indication as to whether squib 68 is electrically short circuited. Comparators 72, 68 are preferably continuously nulling comparators, i.e. comparators that remove offset voltage drift that result from temperature variation or other factors. The resistance value of a squib $R_{sq}$ for an operative squib is small, e.g. between 1.6 Ω and 6 Ω. Because the test current through squib 26 must be relatively small to prevent ignition of the squib, the voltage drop across the squib 26 during a test is relatively small. The use of continuously nulling comparators permits voltage comparisons of less than a millivolt.

During squib operativeness testing, test reference voltage source 60 provides a regulated test voltage to junction $V_R$. Bias reference voltage source 74 provides a regulated bias voltage to junction $V_B$ through resistor 80. The voltage value at $V_B$ is less than the voltage value at $V_R$. When the regulated voltages are applied to junctions $V_R$ and $V_B$, there is a voltage drop across the resistors in the reference resistor network 52 and the bias resistor network 54.

Specifically, when a first voltage is applied to junction $V_R$ and a second, different voltage is applied to $V_B$, there is a voltage drop across resistor 62, across the squib 26, and across resistor 80. The voltage drop across squib 26 and, in turn, the voltage value at $V_{SQ}$ is, as is well known in the art, functionally related to the value of $R_{sq}$. The voltage value at junction $V_{SQ}$ is provided to inverting inputs 70, 66 of comparators 72 and 68, respectively.

Also, when voltages are applied to junctions $V_R$ and $V_B$, voltage drops occur across resistors 90, 100, 110, and 80 that establish reference voltage values at $V_{OP}$ (used for squib open test) and $V_{SH}$ (used for squib shorted test). The value of reference voltages 60, 74 and the values of resistors 90, 100, 110, and 80 are selected so that the voltage value at junction $V_{OP}$, is the maximum acceptable voltage value that would be present at $V_{SQ}$ before the squib is considered to have an open circuit failure condition. The voltage value at junction $V_{OP}$ is provided to the non-inverting input 94 of comparator 72. When the voltage values at junctions $V_{SQ}<V_{OP}$ (i.e. the output of comparator 72 is HIGH), the squib 26 is considered to have passed the squib open circuit test. If a vehicle manufacturer would use a squib having an expected resistance value, when operative, within a different resistance value range, a different bridge network 28 having resistors with appropriate values would be used.

The values of resistors 90, 100, 110, and 80 and the values of reference voltages 60, 74 are also selected such that the voltage value at junction $V_{SH}$ is the minimum acceptable reference voltage value that would be present at $V_{SQ}$ before the squib is considered to have a short circuit failure condition. The voltage value at junction $V_{SH}$ is provided to the non-inverting input of comparator 68. When the voltage values at junctions $V_{SQ}>V_{SH}$ (i.e. the output of comparator 68 is LOW), the squib 26 is considered to have passed the squib short circuit test. If a vehicle manufacturer would use a squib having an expected resistance value, when operative, within a different resistance value range, a different bridge network 28 having resistors with appropriate values would be used.

The total resistance value of reference network 52 is referred to as $R_{TRef}$ and is equal to the series total resistance of R90, R100, and R110. The total resistance value of bias network 54 is referred to as $R_{TBias}$ and is equal to the series total resistance of R62 and $R_{sq}$. In the preferred embodiment, the total resistance of reference network 52, $R_{TRef}$ is greater than the total resistance value of bias network 54, $R_{TBias}$. Preferably, $R_{TRef}$ is approximately 10 times $R_{TBias}$.

As mentioned, comparators 68, 72 are preferably of a type responsive to voltage differences in the millivolt range. The minimum voltage difference that a comparator can detect is referred to as the comparators' sensitivity. The more sensitive the comparator, the less current needed through the squib 26 during testing. The sensitivity of each of the comparators 68, 72 will, in turn, affect the selection of the resistor values in networks 52, 54 and values of reference voltages 60, 74.

For the purpose of explanation, the squib 26 is considered to be open circuited when the resistance value $R_{sq}$ is greater than 6 Ω and is considered to be short circuited when the resistance value $R_{sq}$ is less than 1.6 Ω. Test reference voltage source 60 provides a reference voltage of 6 volts to junction $V_R$. Bias reference voltage source 74 provides (through voltage follower 76) a bias voltage of 1.5 volts to junction $V_B$. The output of the voltage follower 76 is current limited to ±25 mA to prevent excessive current through squib 26 should $V_{SQ}$ be short circuited to the battery supply.

In this example, the voltage difference across the parallel networks 52, 54 between junctions $V_R$ and $V_B$, herein referred to as $V_{TOT}$, is 4.5 volts, i.e., $V_{TOT}=V_R-V_B=4.5$ volts.

The voltage drop across resistors 90, 100, 110, and 62 are respectively referred to herein as $V_{R90}$, $V_{R100}$, and $V_{R110}$, and may be expressed by the following equations:

$$V_{R90} = \frac{R90}{R_{TRef}} V_{TOT} \quad (1)$$

$$V_{R100} = \frac{R100}{R_{TRef}} V_{TOT} \quad (2)$$

$$V_{R110} = \frac{R100}{R_{TRef}} V_{TOT} \quad (3)$$

where $R_{TRef}$ is equal to the series total resistance of resistors 90, 100, 110 and where R90, R100, and R110 are the resistance values of resistors 90, 100, and 110, respectively. Similarly, the voltage drop across resistor 62 is referred to as $V_{R62}$ and may be expressed as:

$$V_{R62} = \frac{R62}{R_{TBias}} V_{TOT} \quad (4)$$

where $R_{TBias}$ equals the series total resistance of resistor 62 and $R_{sq}$ and where R62 is the resistance value of resistor 62.

The voltage value at junction $V_{OP}$ relative to $V_B$ is equal to $V_{TOT}$ minus $V_{R90}$. The voltage value at junction $V_{SH}$ relative to $V_B$ equals $V_{TOT}$ minus the arithmetic sum of the voltage drops $V_{R90}$ and $V_{R100}$.

The voltage value at junction $V_{SQ}$ relative to $V_B$ is equal to $V_{TOT}$ minus $V_{R62}$. Since $R_{TBias}$ includes the squib resistance $R_{sq}$, the voltage drop $V_{R62}$ across resistor R62 is functionally related to $R_{sq}$. Similarly, the voltage value at junction $V_{SQ}$ is functionally related to $V_{R62}$ which, as mentioned, is functionally related to $R_{sq}$.

Comparators 72, 68 of monitoring circuit 30 perform the squib operability tests. Comparator 72 monitors for a squib open circuit condition. Comparator 68 monitors for a squib short circuit condition. The output signal 96 from comparator 72 is a digital HIGH when the squib passes the open circuit test, e.g., the squib resistance is less than 6 Ω. When squib resistance $R_{sq}$ is greater than 6 Ω, squib 26 is considered open circuited. When squib resistance $R_{sq}$ is less than 1.6 Ω, squib 26 is considered short circuited.

As mentioned, voltage value at junction $V_{OP}$ represents the maximum voltage which may appear at junction $V_{SQ}$ before squib 26 is considered to be open circuited. Comparator 72 compares the voltage values from junctions $V_{OP}$ and $V_{SQ}$. When the voltage value at junction $V_{SQ}$ is less than the voltage value at junction $V_{OP}$, squib 26 is considered to have passed the open circuit test. When the voltage value at junction $V_{SQ}$ is greater than the voltage value at junction $V_{OP}$, squib 26 is considered to have failed the open circuit test. Upon this occurrence, comparator 72 provides a digital LOW to controller 32. Controller 32 would then actuate indicator 34 to alert the operator of the determined fault condition.

The voltage values at junctions $V_{SH}$ and $V_{SQ}$ are the input voltage values provided to comparator 68 for the short circuit squib test. The voltage value at junction $V_{SH}$ represents the minimum voltage which may appear at junction $V_{SQ}$ before squib 26 is considered short circuited. Comparator 68 compares the voltage values from $V_{SH}$ and $V_{SQ}$. When the voltage value at junction $V_{SQ}$ is greater than the voltage value at junction $V_{SH}$, squib 26 is considered to pass the short circuit test. Under this condition, comparator 68 provides a digital LOW to controller 32.

When the voltage value at junction $V_{SQ}$ is less than the voltage value at $V_{SH}$, squib 26 is considered to have failed the short circuit test. Under this occurrence, comparator 68 provides a digital HIGH to controller 32. Controller 32 then actuates indicator 34 to alert the operator of the determined fault condition.

The following examples are given to illustrate one embodiment of the present invention and are not meant as limitations. Assume that the operative range of squib resistance value is between 1.6 Ω and 6 Ω and that the resistor values of the bridge network 28 are R62=325 Ω, R90=3250 Ω, R100=44 Ω, and R110=16.2 Ω.

Through elementary application of Ohms' law, in this example $V_{OP}$ can be shown to be equal to 1.5818 volts and $V_{SH}$ can similarly be shown to be equal to 1.5220 volts. If $V_{SQ}$ is between these limits, then the output of comparator 72 will be HIGH and the output of comparator 68 will be LOW. Controller 32 will interpret this as indicating that the squib resistance is neither opened nor shorted. If the squib resistance becomes too great, however, then $V_{SQ}$ will exceed $V_{OP}$ and the output of comparator 72 will drop LOW, indicating that, the squib is open. For example, if the squib resistance is 6.1 Ω, then $V_{SQ}$ will be equal to 1.5829, which exceeds the 1.5818 value of $V_{OP}$. Similarly, if the squib resistance becomes too small, then $V_{SQ}$ will drop below $V_{SH}$ and the output of comparator 68 will go HIGH, indicating that the squib is shorted. For example, if the squib resistance is 1.5 Ω, then $V_{SQ}$ will equal 1.5207 V, which is below the 1.5220 V value of $V_{SH}$. These possible cases are summarized in the chart below:

| CASE | | $V_{12}$ | $V_{68}$ | INDICATOR ON |
| --- | --- | --- | --- | --- |
| 1 | Short | H | H | Yes |
| 2 | Pass | H | L | No |
| 3 | Open | L | L | Yes |

As can be seen from this chart, controller 32 will actuate indicator 34 if the comparator outputs are either both HIGH or both LOW.

If a vehicle manufacturer were to select a squib having a different allowable resistance range, e.g., 2.5 Ω to 6.5 Ω, then only the resistors in test network 54 and bias network 52 would have to be changed accordingly. The remaining circuit components in monitoring circuit 30 and controller 32 would not be changed. One skilled in the art will appreciate that the internal program of the controller 32 would not need to be altered since it is only monitoring the output of comparators 68, 72 for their then-present digital state. The voltage values that define a pass condition or a fail condition are selected by the reference network 52 to accommodate the bias network 54. Only the resistors in the bridge network are selected in accordance with the resistance value of the squib used by the OEM, i.e., the vehicle manufacturer. Therefore, in accordance with a preferred embodiment of the present invention, the monitoring circuit 30 is a universal module. The firing circuit 24, monitoring circuit 30, and controller 32 are universal to any restraint system of this type.

Preferably, the monitoring circuit 30 also includes a short-to-battery and short-to-ground tester 109. The tester 109 is operatively coupled between the squib junction $V_{SQ}$ and the controller 32. The tester 109 is operatively coupled to the reference voltage 60 and to bias voltage 74. The tester 109 compares the voltage present at $V_{SQ}$ against a predetermined maximum value to determine if the squib is shorted to the supply voltage, e.g., battery. The tester 109 also compares the voltage present at $V_{SQ}$ against a predetermined minimum value to determine if the squib is shorted to electrical ground. If the tester determines a short-to-battery or a short-to-ground exists, the tester provides a failure indication to controller 32. Upon receiving a failure indication from tester 109, the controller 32 would actuate indicator 34.

The invention has been described with regard to a restraint system having a driver's restraint, e.g., a driver's side air bag. Those skilled in the art will appreciate that the invention is applicable to systems having driver and passenger air bags or any number of actuatable restraints, each triggered by an associated squib, e.g., knee bolsters, belt pretensioners, etc. In a system having a driver's and passenger's air bag, each squib would have an associated reference resistor network and an associated bias resistor network. If the two squibs had the same resistance range, e.g., 1.6 Ω to 6 Ω, only one reference network would be required. The monitoring circuit would include two associated comparators for each squib that would monitor if the squib resistance of its associated squib was within its resistance range.

Figure 2:
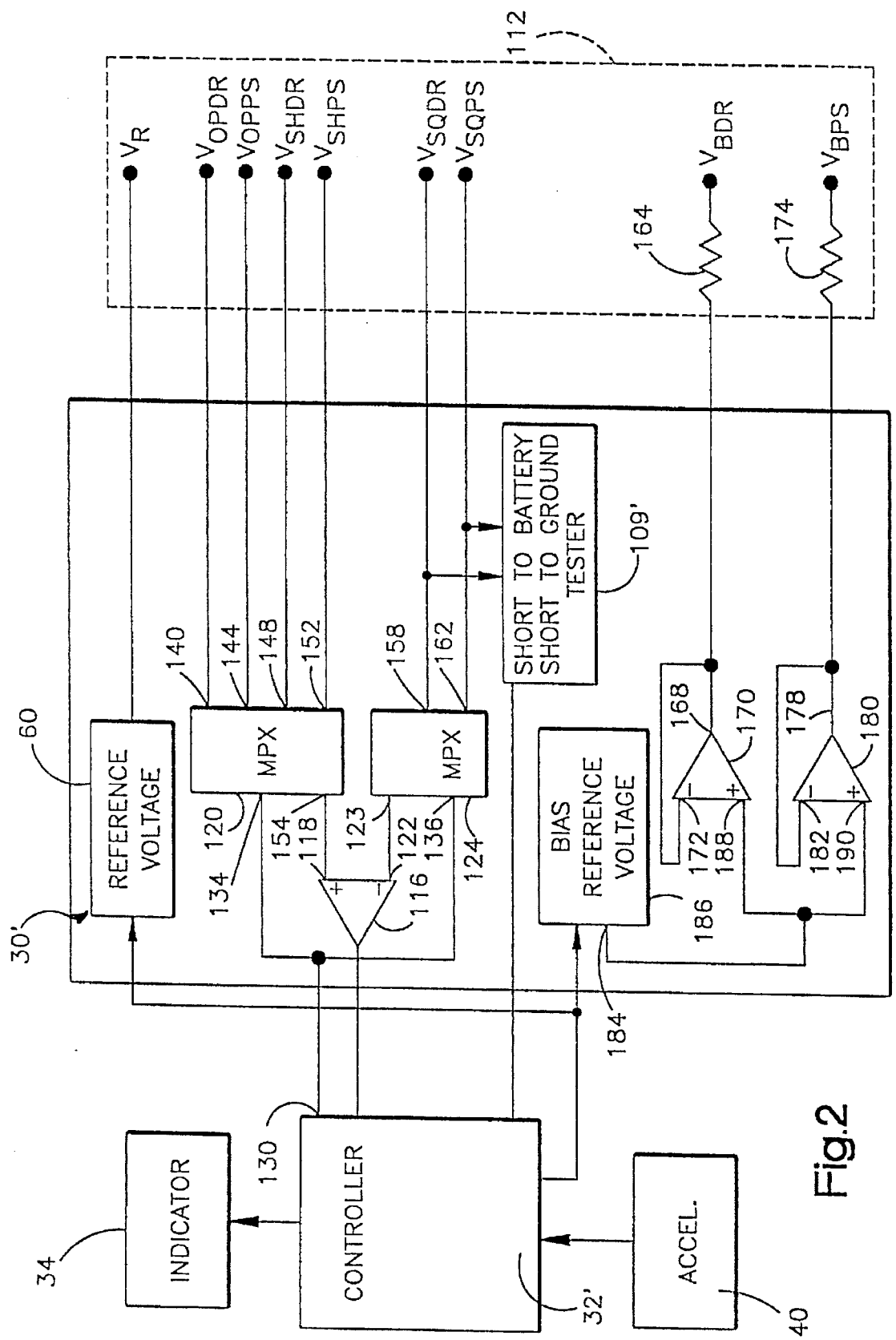
FIG. 2 is a schematic diagram of another embodiment made in accordance with the present invention.

FIG. 2, shows an embodiment of the present invention for use with a restraint system having more than one squib. In particular, this embodiment includes a driver's air bag and associated squib and a passenger's air bag and associated squib.

Elements shown in FIG. 2 that have the same functions as those in FIG. 1 are numbered the same and are, therefore, not described in detail. The actuation circuit and the resistor arrangements in the bridge networks for each air bag are the same as those shown in FIG. 1. Therefore, only multiple bridge network junctions 112 connecting the multiple bridge network to monitoring circuit 30', are shown in FIG. 2.

The network junctions 112 have designations similar to those described with regard to FIG. 1. Specifically, $V_R$ is the reference voltage output from reference source 60 connected to the parallel reference and bias networks. $V_{OPDR}$ is the upper limit reference voltage for the driver's side open squib test. $V_{OPPS}$ is the upper limit reference voltage for the passenger's side open squib test. $V_{SHDR}$ is the lower limit reference voltage for the driver's side shorted squib test. $V_{SHPS}$ is the lower limit reference voltage for the passenger's side shorted squib test, $V_{SQDR}$ is the driver's squib high side connection point. $V_{SQPS}$ is the passenger's squib high side connection point. $V_{BDR}$ is the driver's bias voltage at the driver's squib low side. $V_{BPS}$ is the passenger's bias voltage at the passenger's squib low side. Each of the $V_{BDR}$ and $V_{BPS}$ are provided from a bias reference voltage source 186 through associated voltage follows 170, 180, respectively. Specifically, an output 184 of bias reference voltage 186 is connected to the non-inverting input 188 of operational amplifier 170 and the non-inverting input 190 of operation amplifier 180. The output 168 of operational amplifier 170 is connected to the inverting input 172 of operational amplifier 170 and to resistor 164. The output 178 of operational amplifier 180 is connected to the inverting input 182 of operational amplifier 180 and to resistor 174.

Junctions $V_{OPDR}$ and $V_{OPPS}$ in FIG. 2 have functions similar to junction $V_{OP}$ in FIG. 1 described above. Junction $V_{OPDR}$ is connected to an input terminal 140 of a one-of-four analog multiplexer 120 in monitoring circuit 30'. The voltage value at junction $V_{OPDR}$ is the maximum acceptable reference voltage before a squib of a driver's air bag is considered to have an open circuit failure. Junction $V_{OPPS}$ is similarly connected to an input terminal 144 of multiplexer 120. The voltage value at junction $V_{OPPS}$ is the maximum acceptable reference voltage before a squib of a passenger's air bag is considered to have an open circuit failure.

Junctions $V_{SHDR}$ and $V_{SHPS}$ in FIG. 2 have functions similar to junction $V_{SH}$ in FIG. 1 described above. Junction $V_{SHDR}$ is connected an another input terminal 148 of multiplexer 120. The voltage value at junction $V_{SHDR}$ is the minimum acceptable reference voltage before a squib of a driver's air bag is considered to have a short circuit failure. Junction $V_{SHPS}$ is similarly connected to an input terminal 152 of multiplexer 120. The voltage value at junction $V_{SHPS}$ is the minimum acceptable reference voltage before a squib of a passenger's air bag is considered to have a short circuit failure. An output terminal 154 of multiplexer 120 is connected to the input terminal 118 of a comparator 116.

Junctions $V_{SQDR}$ and $V_{SQPS}$ in FIG. 2 have functions similar to junction $V_{SQ}$ in FIG. 1. Junction $V_{SQDR}$ is connected to an input terminal 158 of a one-of-two analog multiplexer 124 in monitoring circuit 30'. The voltage value at junction $V_{SQDR}$ is the bias voltage established at the squib of the driver's air bag. Junction $V_{SQPS}$ is similarly connected to an input terminal 162 of multiplexer 124. The voltage value at junction $V_{SQPS}$ is the bias voltage established at the squib of the passenger's air bag. An output terminal 123 of multiplexer 124 is connected to a second input 122 of comparator 116. The output of comparator 116 is connected to controller 32'. Controller 32' has output address lines connected to address input lines 134, 136 of multiplexers 120, 124. Although a single address line is shown, those skilled in the art will appreciate that, typically, more than one line is used for addressing.

Voltage followers 170, 180 are current limiting and provide a constant bias voltage from regulator 186 to junction $V_{BDR}$ through resistor 164 and to junction $V_{BPS}$ through resistor 174.

Test reference voltage source 60 provides a test voltage to junction $V_R$ as described above. Junction $V_R$ is a common junction for the parallel connected reference networks and bias networks of the multiple bridge networks. Bias reference voltage source 186 provides a bias voltage to junctions $V_{BDR}$ and $V_{BPS}$ through resistor 164 and resistor 174. As described above, when voltage is applied to junction $V_R$, there is a voltage drop across the resistors in the bias and reference networks.

Controller 32' provides address signals to multiplexers 120 and 124 according to which squib operativeness test is to be performed. In response to the address signal, multiplexer 120 connects one of its four input lines (the squib operativeness reference voltage signals from $V_{OBDR}, V_{OPPS}, V_{SHDR},$ and $V_{SHPS}$) to its output and thus to one input to comparator 116. Likewise, multiplexer 124 connects one of its two input lines (the squib test voltage signals from $V_{SQDR}$ or $V_{SQPS}$) to its output and thus to the other input to comparator 116.

Comparator 116 performs the same "greater than" or "less than" analysis in performing the squib operativeness test as described above. Specifically, $V_{SQDR}$ is sequentially compared against $V_{OPDR}$ and $V_{SHDR}$, and then $V_{SQPS}$ is sequentially compared against $V_{OPPS}$ and $V_{SHPS}$. The output signals of comparator 116 which result from each comparison are provided to controller 32' indicating whether the squib is operative or not operative. Controller 32' provides a signal and actuates indicator 34 to alert the operator if a fault condition is detected.

From the above description of preferred embodiments of the invention, those skilled in the art will perceive improvements, changes and modifications. Such improvements, changes and modifications within the skill of the art are intended to be covered by the appended claims.

Having described a preferred embodiment of the invention, the following is claimed:

1. An apparatus for testing the operativeness of a squib in an actuatable restraint system, said squib having a resistance value, when operative, within a predetermined range of resistance values, said squib being connected in series with a firing circuit across a first source of electrical energy, said firing circuit including an actuatable switch, actuation of said switch resulting in electrical current passing through said squib from said first source of electrical energy sufficient to ignite said squib, said apparatus comprising:

monitoring circuit means for monitoring the operativeness of said squib, said monitoring circuit means including a second source of electrical energy, wherein said second source of electrical energy is a regulated source of electrical energy, said monitoring circuit means further including a bridge circuit means having a biasing resistor network and a reference resistor network, both said resistor networks being operatively connected to said second source of electrical energy, said biasing resistor network being electrically connected in series with said squib and in parallel with said firing circuit, said biasing resistor network establishing a continuous flow of non-actuating test current from said second source through said squib, said test current being the only continuous current through said squib when said firing circuit is not actuated, said biasing resistor network and said reference resistor network each including associated resistors having selected resistor values, said reference resistor network establishing a squib reference voltage value, said biasing resistor network establishing a test voltage value at one terminal of said squib, said monitoring circuit means further including comparing means for comparing said test voltage value at said one terminal of said squib resulting from said test current through said biasing resistor network against said squib reference voltage value of said reference resistor network and for providing a signal indicative of the comparison, said signal indicative of said comparison being indicative of the operativeness of said squib;

wherein the resistor values of said biasing resistor network, the resistor values of said reference resistor network, and the value of said second source of electrical energy are selected so that at least one terminal of said squib will provide an expected voltage value, when operative, that falls within a range of values defined by said reference resistor network; and control means for monitoring said signal from said comparing means of said monitoring circuit means and for controlling an indicator in response to said signal from said comparing means.

2. The apparatus of claim 1 wherein said biasing resistor network includes a current limiting voltage follower for limiting the current applied to said squib.

3. The apparatus of claim 1 wherein said reference resistor network includes series connected resistors for establishing two voltage reference values that define upper and lower voltage limits of the expected voltage value at said one terminal of said squib and wherein said monitoring circuit includes two comparators, a first comparator for comparing said test voltage value at said one terminal of said squib against the upper voltage limit and a second comparator for comparing said test voltage value at said one terminal of said squib against the lower voltage limit.

4. The apparatus of claim 3 wherein said first comparator provides an indication of whether the squib is open circuited.

5. The apparatus of claim 3 wherein said second comparator provides an indication of whether the squib is short circuited.

6. The apparatus of claim 1 wherein said restraint system includes at least two squibs and wherein said monitoring circuit means includes a single comparator means and multiplexer circuit means for selectively connecting said reference voltage value and the voltage value present at one of each of the squibs to said single comparator means.

* * * * *